(12) United States Patent
Fluegge et al.

(10) Patent No.: US 7,941,296 B2
(45) Date of Patent: May 10, 2011

(54) BENCHMARKING AND GAP ANALYSIS SYSTEM AND METHOD

(75) Inventors: Ronald M. Fluegge, The Colony, TX (US); Richard B. Jones, The Woodlands, TX (US)

(73) Assignee: HSB Solomon Associates, LLC, Dallas, TX (US)

( * ) Notice: Subject to any disclaimer, the term of this patent is extended or adjusted under 35 U.S.C. 154(b) by 731 days.

(21) Appl. No.: 11/963,015

(22) Filed: Dec. 21, 2007

(65) Prior Publication Data

US 2008/0270078 A1 Oct. 30, 2008

Related U.S. Application Data

(60) Provisional application No. 60/926,468, filed on Apr. 27, 2007.

(51) Int. Cl.
*G06F 19/00* (2006.01)
*G06F 17/40* (2006.01)

(52) U.S. Cl. ....... 702/186; 73/865.9; 702/182; 702/187; 702/189

(58) Field of Classification Search .............. 73/432.1, 73/865.8, 865.9; 700/90, 95, 108, 111; 702/1, 702/33, 34, 35, 127, 182, 186, 187, 189; 705/1.1, 7, 11

See application file for complete search history.

(56) References Cited

U.S. PATENT DOCUMENTS

| | | | | |
|---|---|---|---|---|
| 2,883,255 | A * | 4/1959 | Anderson | ....................... 346/34 |
| 3,321,613 | A * | 5/1967 | Searle | ....................... 702/182 |
| 6,708,155 | B1 | 3/2004 | Honarvar et al. | |
| 6,847,854 | B2 | 1/2005 | Discenzo | |
| 6,968,293 | B2 | 11/2005 | Wiegand | |
| 7,233,910 | B2 | 6/2007 | Hileman et al. | |
| 2001/0053993 | A1 | 12/2001 | McLean et al. | |
| 2002/0013720 | A1 | 1/2002 | Ozono et al. | |
| 2003/0083912 | A1 | 5/2003 | Covington, III et al. | |
| 2004/0036458 | A1 | 2/2004 | Johnson et al. | |
| 2004/0167810 | A1 | 8/2004 | Jutsen | |
| 2009/0093996 | A1 * | 4/2009 | Fluegge et al. | ............... 702/182 |
| 2009/0093997 | A1 * | 4/2009 | Fluegge et al. | ............... 702/182 |
| 2009/0093998 | A1 * | 4/2009 | Fluegge et al. | ............... 702/182 |

OTHER PUBLICATIONS

Gerald E. Binder, et al; Predicting Unit Availability—Top-Down Analyses for Predicting Electric Generating Unit Availability; Jun. 1991; 29 pages.

North American Electric Reliability Council; Predicting Generating Unit Reliability—A Methodology for Predicting Generating Unit Reliability Based on Design Characteristics, Operational Factors, and Maintenance and Plant Betterment Activities; Dec. 1995; 46 pages.

Thomas J. Redling; A Methodology for Developing New Product Line Requirements Through Gap Analysis; IEEE; Honeywell Defense and Space Electric Systems; Albequerque, NM; 2003, 11 pages.

(Continued)

*Primary Examiner* — Edward R Cosimano
(74) *Attorney, Agent, or Firm* — Greenberg Traurig LLP

(57) ABSTRACT

A computer-implemented method is provided for creating a peer unit and comparing that peer unit to a target unit in order to determine the difference in performance between the target unit and a peer unit. The peer unit is a hypothetical construct of user-defined performance variables whose values are determined based on outstanding performing units in a user-defined group. This comparison allows the user to assess what parameters of the target unit should be changed in order to improve overall performance.

14 Claims, 8 Drawing Sheets

OTHER PUBLICATIONS

Lishan Kang, Aimin Zhou, Bob McCay, Yan Li, and Zhuo Kang; Benchmarking Algorithms for Dynamic Travelling Salesman Problems; IEEE; 2004, pp. 1286-1292.

K. C. Tan, Tong H. Lee, D. Khoo, and E. F. Khor; A Multiobjective Evolutionary Algorithm Toolbox for Computer-Aided Multiobjective Optimization; IEEE Transactions on Systems, Man, and Cybernetics; vol. 31, No. 4, Aug. 2001, pp. 537-556.

Yuren Zhou, Jun He, Yuanxiang Li, and Lishan Kang; Multi-Objective and MGG Evolutionary Algorithm for Constrained Optimization; IEEE, 2003, 5 pages.

Ronald C. Nyhan and Lawrence L. Martin; Comparative Performance Measurement: A Primer on Data Envelopment Analysis; Public Productivity & Management Review; vol. 22, No. 3, Mar. 1999, pp. 348-364.

S. Ghazinoory, A. Aliahmadi, S. Namdarzangeneh, and S. H. Ghodsypour; Using AHP and L.P. for Choosing the Best Alternatives Based the Gap Analysis; Applied Mathematics and Computation; 184, 2007, pp. 316-321.

Robert F. Bordley; Integrating Gap Analysis and Utility Theory in Service Research; Journal of Service Research; vol. 3, No. 4, May 2001, pp. 300-309.

Pervaiz K. Ahmed and Mohammed Rafiq; Integrating Benchmarking: A Holistic Examination of Select Techniques for Benchmarking Analysis; Benchmarking for Quality Management & Technology, vol. 5, No. 3, 1998, pp. 225-242.

Gerald J. Balm; Benchmarking and Gap Analysis: What is the Next Milestone?; Benchmarking for Quality Management & Technology; vol. 3, No. 4, 1996, pp. 28-33.

\* cited by examiner

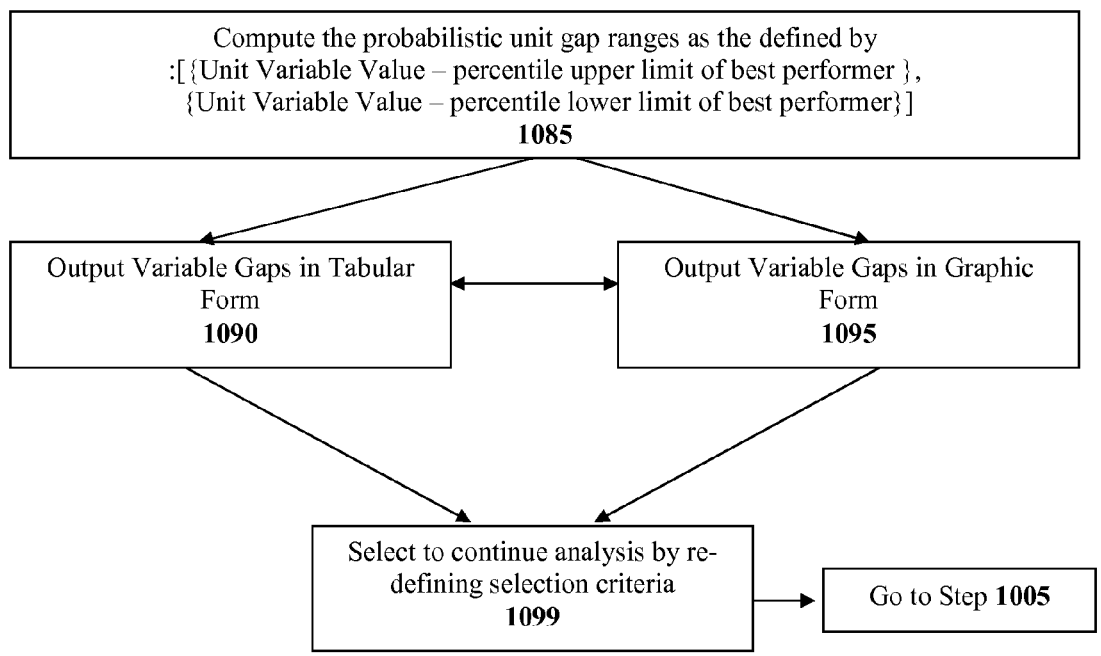

FIG. 4A: Profile NxL Variables Available for User Selection

| | |
|---|---|
| NOF | Net output factor |
| GOF | Gross output factor |
| NCF | Net capacity factor |
| GCF | Gross capacity factor |
| NHR | Net heat rate |
| GHR | Gross heat rate |
| ATM_STARTS | Attempted starts |
| ACT_STARTS | Actual starts |
| START_REL | Starting reliability |
| SH | Service Hours (Performance 02 Card) |
| RSH | Reserve Shutdown Hours (Performance 02 Card) |
| PMP_HRS | Pumping Hours (Performance 02 Card) |
| SYNCH_HRS | Synchronous Condensing Hours (Performance 02 Card) |
| POH | Planned Outage Hours |
| UPOH_SF | Forced Outage Hours and Startup Failure Hours |
| MOH | Maintenance Outage Hours |
| SEH | Extension of Scheduled Outages |
| PO | Planned Outage Hours |
| PO_SE | Scheduled Outage Extension Hours of Planned Outages |
| MO | Maintenance Outage Hours |
| MO_SE | Scheduled Outage Extension Hours of Maintenance |
| SF | Startup Failure Hours |
| U1 | Unplanned (Forced) Outage Hours |
| U2 | Unplanned (Forced) Outage Hours |
| U3 | Unplanned (Forced) Outage Hours (U3) |
| D1 | Equivalent Unplanned (Forced) Derated Hours |
| D2 | Equivalent Unplanned (Forced) Derated Hours |
| D3 | Equivalent Unplanned (Forced) Derated Hours |
| D4 | Equivalent Maintenance Derated Hours |
| D4_DE | Extension of Maintenance Derating Equivalent Hours |
| PD | Equivalent Planned Derated Hours |
| PD_DE | Extension of Planned Derating Equivalent Hours |
| RS | Reserve Shutdown Hours |
| NC | Noncurtailing Hours |
| EUFDH_RS | Equivalent Unplanned (Forced) Derated Hours During |
| ESEDH | Equivalent Seasonal Derated Hours |
| AH | Available Hours |
| POF | Planned Outage Factor (%) |
| UOF | Unplanned Outage Factor (%) |
| FOF | Forced Outage Factor (%) |
| MOF | Maintenance Outage Factor (%) |
| SOF | Scheduled Outage Factor (%) |
| UF | Unavailability Factor (%) |
| AF | Availability Factor (%) |

FIG. 4B: Profile NxL Variables Available for User Selection-Continued

| | |
|---|---|
| SEF | Service Factor (%) |
| SDF | Seasonal Derating Factor (%) |
| UDF | Unit Derating Factor (%) |
| EUF | Equivalent Unavailability Factor (%) |
| EAF | Equivalent Availability Factor (%) |
| FOR | Forced Outage Rate (%) |
| EFOR | Equivalent Forced Outage Rate (%) |
| OperSupEng500 | Fossil – Operations Supervision & Engineering |
| Fuel501 | Fossil – Fuel expense |
| SteamExp502 | Fossil – Steam expenses |
| SteamOtherSources503 | Fossil – Steam from other sources |
| SteamTrans504 | Fossil – Steam transferred – Credit |
| ElectricExp505 | Fossil – Electric expenses |
| MiscSteamExp506 | Fossil – Miscellaneous steam power expenses |
| Rents507 | Fossil – Rents |
| OperSuppliesExp508 | Fossil – Operation supplies and expenses |
| Allowances509 | Fossil – Allowances |
| MaintSupEng510 | Fossil – Maintenance supervision and engineering |
| MaintStruc511 | Fossil – Maintenance of structures |
| MaintBoilerPlant512 | Fossil – Maintenance of boiler plant |
| MaintElectPlant513 | Fossil – Maintenance of electric plant |
| MaintMiscSteam514 | Fossil – Maintenance of miscellaneous steam plant |
| SteamNonMaj515 | Fossil – Maintenance of steam production plant |
| NucOperSupEng517 | Nuclear – Operation supervision and engineering |
| NucFuel518 | Nuclear – Fuel expense |
| NucCoolantAndWater519 | Nuclear – Coolants and water |
| NucSteamExp520 | Nuclear – Steam expenses |
| NucSteamOtherSources52 | Nuclear – Steam from other sources |
| NucSteamTrans522 | Nuclear – Steam transferred – Credit |
| NucElectricExp523 | Nuclear – Electric expenses |
| NucMiscPowerExp524 | Nuclear – Miscellaneous nuclear power expenses |
| NucRents525 | Nuclear – Rents |
| NucMaintSupEng528 | Nuclear – Maintenance supervision and engineering |
| NucMaintStruc529 | Nuclear – Maintenance of structures. |
| NucMaintReactorPlant530 | Nuclear – Maintenance of reactor plant equipment |
| NucMaintElectPlant531 | Nuclear – Maintenance of electric plant |
| NucMaintMiscPlant532 | Nuclear – Maintenance of miscellaneous nuclear plant |
| HydOperSupEng535 | Hydro – Operation supervision and engineering |
| HydWaterForPower536 | Hydro – Water for power |
| HydHydraulicExp537 | Hydro – Hydraulic expenses |
| HydElectricExp538 | Hydro – Electric expenses |
| HydMiscPowerExp539 | Hydro – Miscellaneous hydraulic power generation |
| HydRents540 | Hydro – Rents |
| HydOperSuppAndExp540 | Hydro – Operation supplies and expenses |

FIG. 4C: Profile NxL Variables Available for User Selection – Continued

| | |
|---|---|
| HydMaintSupEng541 | Hydro – Maintenance supervision and engineering |
| HydMaintStruc542 | Hydro – Maintenance of structures |
| HydMaintResDams543 | Hydro – Maintenance of reservoirs, dams, and |
| HydMaintElectPlant544 | Hydro – Maintenance of electric plant |
| HydMaintMiscPlant545 | Hydro – Maintenance of miscellaneous hydraulic plant |
| HydMaintHydProdPlant54 | Hydro – Maintenance of hydraulic production plant |
| OthOperSupEng546 | Other – Operation supervision and engineering |
| OthFuel547 | Other – Fuel |
| OthGenExp548 | |
| Other – Generation | |
| OthMiscPowerExp549 | Other – Miscellaneous other power generation expenses |
| OthRents550 | Other – Rents |
| OthOperSuppAndExp550_ | Other – Operation supplies and expenses |
| OthMaintSupEng551 | Other – Maintenance supervision and engineering |
| OthMaintStruc552 | Other – Maintenance of structures |
| OthMaintGenElectPlant55 | Other – Maintenance of generating and electric |
| OthMaintMiscPlant554 | Other – Maintenance of miscellaneous other power |
| OthMaintOtherProdPlant | Other – Maintenance of other power production plant |
| PurchasedPower555 | Other – Purchased power |
| SystemControlLoadDisp55 | Other – System control and load dispatching |
| OtherExpenses557Other – | Other expenses |
| BoilerBoilerComponents | Fossil Steam – Boiler/Boiler Components |
| BoilerDraftCombustionAir | Fossil Steam – Boiler Draft/Combustion Air Group |
| FuelSystemsGrp | Fossil Steam – Fuel Systems Group |
| CombustionGasSystemsGr | Fossil Steam – Combustion Gas Systems Group |
| FGDScrubber | Fossil Steam – FGD (Scrubber) Group |
| SelectiveCatalyticReductio | Fossil Steam – Selective Catalytic Reduction System |
| CoolingTowerMiscWaterC | Fossil Steam – Cooling Tower, Misc. Water, Chemical |
| SteamCondensateFeedwate | Fossil Steam – Steam, Condensate, Feedwater System |
| MainTurbineSystem | Fossil Steam – Main Turbine System |
| MainGeneratorSystem | Fossil Steam – Main Generator System |
| AshWastewaterSystemsGr | Fossil Steam – Ash, Waste Water Systems Group |
| BottomAshDisposalSystem | Fossil Steam – Bottom Ash Disposal System |
| FlyAshDisposalSystem | Fossil Steam – Fly Ash Disposal System |
| OtherDirectUnitCosts | Fossil Steam – Other Direct Unit Costs |
| HydroOther | Hydro – Other Direct Unit Costs |
| CTCombinedCycleGrp | Combustion Turbine, Combined Cycle Group |
| CombinedCycleHRSG | Combined Cycle Heat Recovery Steam Generator |

BENCHMARKING AND GAP ANALYSIS SYSTEM AND METHOD

CROSS-REFERENCE TO RELATED APPLICATIONS

This application claims the benefit of expired U.S. Provisional Application Ser. No. 60/926,468, filed Apr. 27, 2007, which is incorporated by reference in its entirety.

BACKGROUND

Field of the Invention

The invention relates to a system and method for comparative operational performance analysis using computer software for business and facilities, such as electrical power generating stations, manufacturing plants, and distribution centers, that enables quantitative benchmarking and probabilistic gap analysis for user-defined variables.

SUMMARY

A method enhances benchmarking by adding the ability to dynamically benchmark unit performance with a software tool and database configuration that also has the functionality of monitoring and analyzing several key performance indicators. The benchmarking function determines the leading performers of a user-defined dataset and then computes the differences in the desired variables between a hypothetical best performer and the selected units.

A computer-implemented method of comparing an output variable value of a target unit with a corresponding output variable value of a peer unit comprises the steps of: (a) determining a value of a first composite performance variable for a base unit, wherein the base unit meets at least one predefined parameter, comprising the steps of: performing a non-linear optimization with at least one constraint, wherein a first composite performance variable comprises: at least one base unit input variable; (b) determining a value of a second composite performance variable for the plurality of base unit, wherein the second composite performance variable comprises: at least one base unit output variable; (c) selecting at least two outstanding base units dependent on: the value of the first composite performance variable, and the value of the second composite performance variable; (d) determining a peer unit based on all outstanding base units, wherein determining a peer unit comprises: calculating output variable values for the peer unit based on the output variable values of the outstanding base units; (e) selecting a target unit for comparison to the peer unit; (f) selecting an output variable value for the target unit that corresponds to an output variable value for the peer unit; and (g) comparing the output variable value for the target unit with the corresponding output variable value for the peer unit, wherein steps (a), (b), (d), and (g) are performed by one or more computers. In another method the target unit is an outstanding base unit.

A system comprises: a server, comprising: a processor, and a storage subsystem; a database stored in the storage subsystem comprising: unit operating data; a computer program stored in the storage subsystem, when executed causing the processor to: (a) determine the value of a first composite performance variable for a plurality of base units, wherein the first composite performance variable includes at least one base unit input variable, and wherein the computer program when executed causes the processor to perform a non-linear optimization with at least one expert constraint; (b) determine the value of a second composite performance variable for the plurality of base units, wherein the second composite performance variable includes at least one base unit output variable; (c) select at least one outstanding base unit dependent on: the value of the first composite performance variable, and the value of the second composite performance variable; (d) determine a peer unit based on all outstanding base units, wherein the executed computer program causes the processor to: calculate output variable values for the peer unit based on the output variable values of the outstanding base units; (e) select a target unit for comparison to the peer unit, wherein the target unit may be an outstanding base unit; (f) select an output variable value for the target unit that corresponds to an output variable value for the peer unit; and (g) compare the output variable value for the target unit with the corresponding output variable value for the peer unit. In another system, when executed, the computer program causes the processor to perform a non-linear optimization with at least one constraint. In yet another system, the target unit is an outstanding base unit.

Methods may use a database that contains unit level data for generating a comparison. In the area of power generation, typical data for generating units would relate to design, location, fuel, technology, and performance data. The data is organized in the form of variables that contain performance information or behaviors and characteristics that correlate with performance in some way. For example, an input or cause variable may be the number of engine starts for a generating unit since the number of engine starts correlates with engine performance and maintenance costs over the life of the generating unit. While maintenance costs and engine performance factors (such as $/MWH and heat rate) may be output or effect variables.

Another method utilizes a dynamic software platform where users enter data on a regular basis and use the software on demand to analyze, benchmark, and compare results of their units relative to other similar units. The user dynamically specifies the comparative performance database by completing the selection criteria screen and also enters the unit(s) identification number(s) that identifies the units to be benchmarked. This type of quantitative benchmarking enables the user to dynamically set up comparative performance analyses. The comparative performance is measured from the range, and the peer unit performance is determined from units selected for benchmarking. The results of the internal non-linear optimization analysis and probabilistic gap calculations are shown to the software user as part of the software's functionality and graphical displays.

The steps in the methods, and system elements disclosed and claimed herein, as applicable, can be performed by a single entity or multiple entities, on a single system or multiple systems, and any and all method steps and system elements may be performed or located in the United States or abroad, all permutations of which are expressly within the scope of the claims and disclosure.

BRIEF DESCRIPTION OF THE DRAWINGS

These and further features will be apparent with reference to the following description and drawings, wherein:

FIGS. 3A and 3B are a flow chart of the preferred embodiment of the method; and

FIGS. 4A, 4B and 4C are a list of variables from the IEEE Standard No. 762 "Definitions for Use in Reporting Electric Generating Unit Reliability, Availability and Productivity" available for user selection in the system and method disclosed herein.

DETAILED DESCRIPTION

Unit is broadly defined as a distinct entity. The term unit may refer to a single unit within a larger group, such as operating entities within a facility or business setting. Examples of units include electric power generators, chemical reactor vessels, pharmaceutical production lines, and package delivery centers.

Figure 1A:
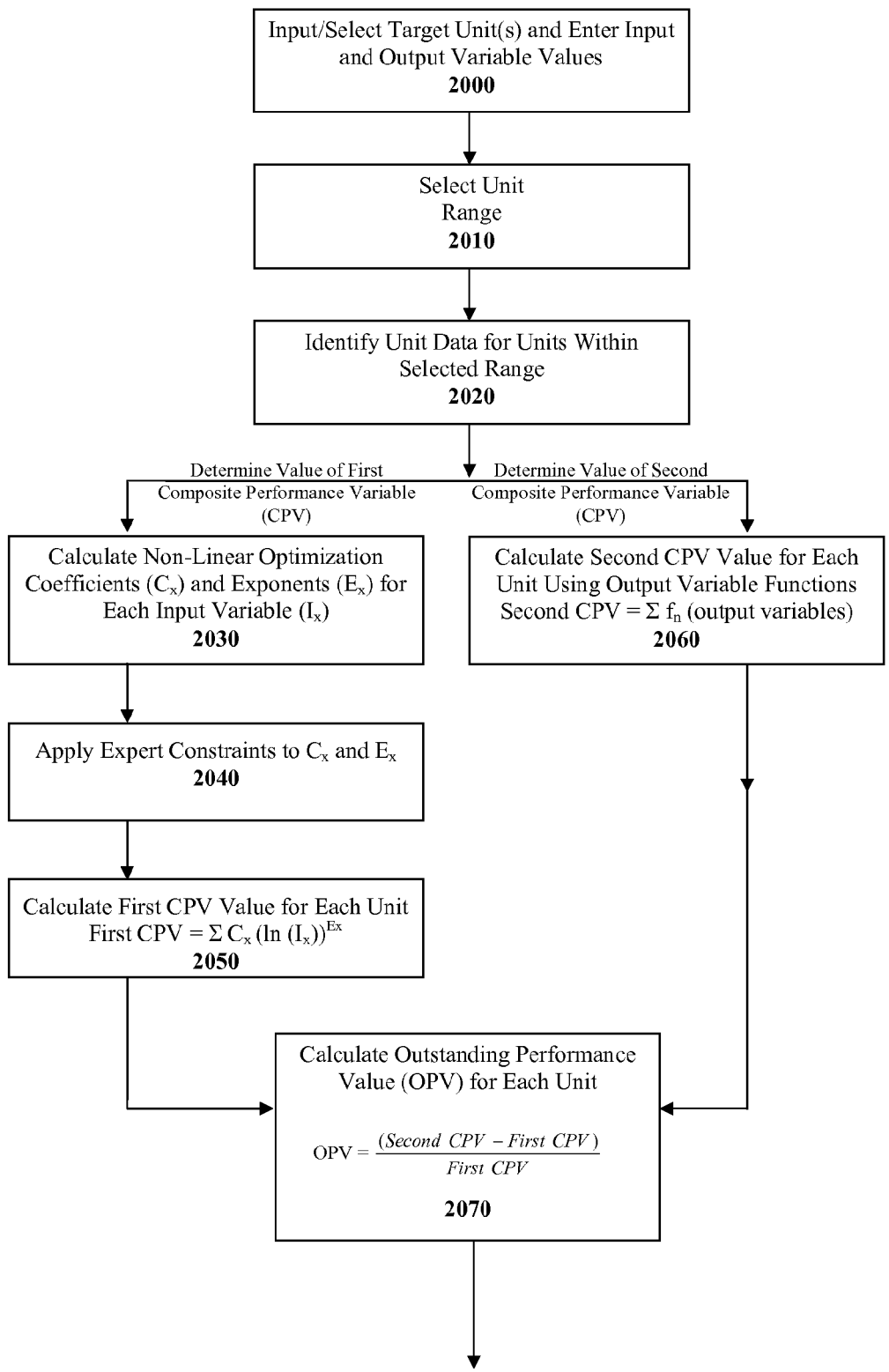
FIGS. 1A and 1B are a flow chart of the comparative analysis method.
Figure 1B:
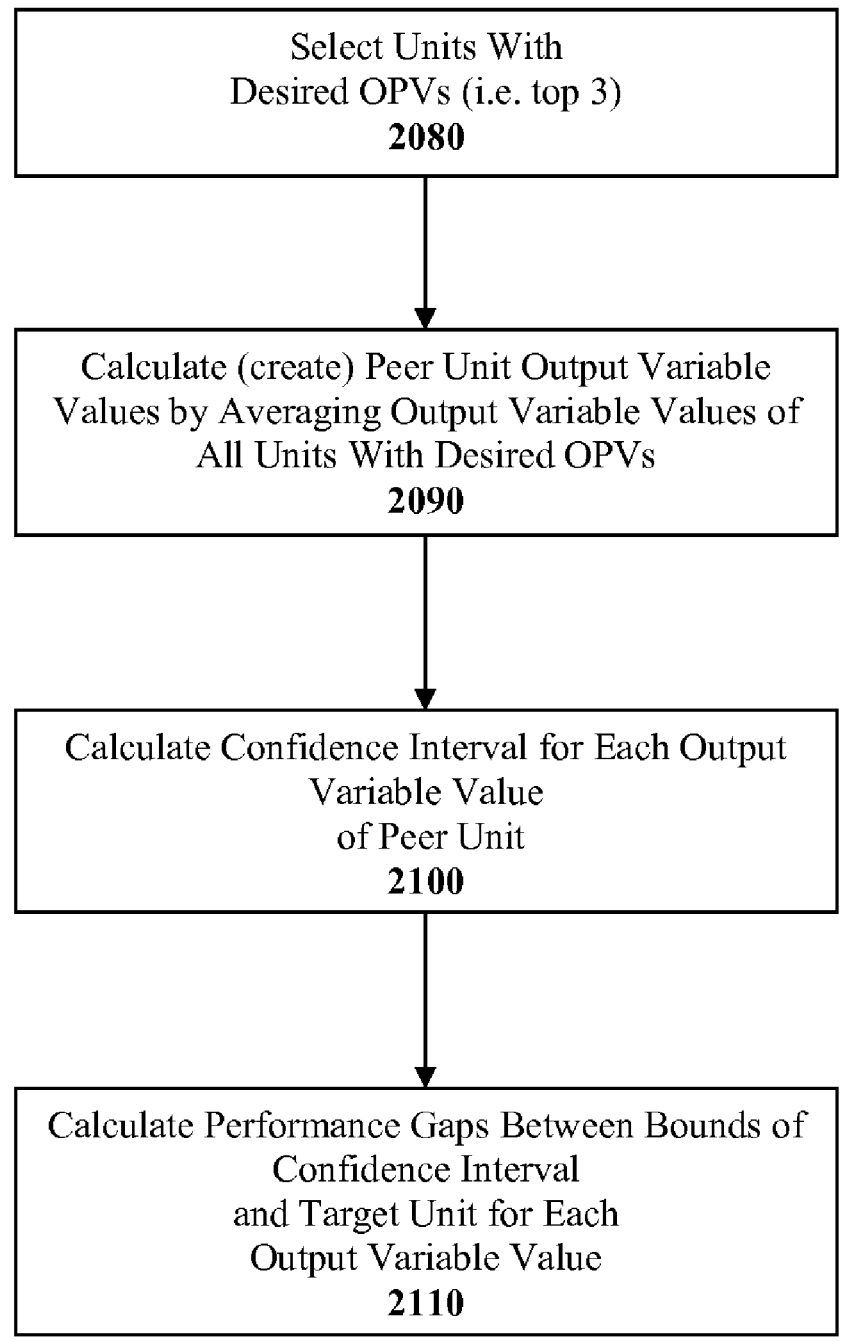

With reference to FIGS. 1A and 1B, in an embodiment of the method, users are able to enter information about units into the database, which helps keep information current for all users to perform comparisons. This embodiment of the method includes the set up of a series of input and output variables to provide comparison information to the users step 2000. The variables used may be configured by the user, but will more typically be configured by an analysis controller.

The user specifies one or more target units for comparison with a peer unit that will be determined by this embodiment of the method. The target unit data may be input by the user or existing unit data may be selected by using a unit identifier step 2000.

The database is flexible enough to allow the user to select comparison units based on a single characteristic, multiple characteristics, or simply all units. For example, power generation units could be selected by a performance characteristic, such as power generating capacity, and a characteristic unrelated to performance, such as a geographic region step 2010.

After the user selects the range of units for comparison step 2010, the units that meet the selection criteria are selected step 2020. The selection of units may involve the identification of unit data for processing or the extraction of unit data from the database to a processing module. Once a set of units are selected, input and output variable data for the selected units may be used to calculate the value of a composite performance variable used to predict performance (based on the input variables) steps 2020, 2030, and 2040 and the value of a composite performance variable used to describe actual performance (based on the output variables) step 2050.

The composite performance variable used to predict performance ($CPV_p$) is calculated using non-linear optimization analysis methods and the input variables for the selected units to determine a value that represents the anticipated performance of each unit step 2030. In a more preferred embodiment, the non-linear optimization is modified using professional expertise in benchmarking to safeguard the optimization process and to prevent erroneous $CPV_p$ values step 2040. This professional expertise includes but is not limited to placing maximum and minimum limits on the coefficients and exponents determined during the non-linear optimization process. The $CPV_p$ value for each unit is calculated using the summation of the input variable value for that unit after applying coefficients and exponents determined during the non-linear optimization, and other mathematical functions as necessary step 2050. For example, a $CPV_p$ calculation may be $CPV_p = \Sigma C_x (\ln(I_x))^{Ex}$, wherein $I_x$=the series of input variable values for a selected unit, $C_x$=the series of coefficients for the input variables, and $E_x$=the series of exponents for the input variables. This depiction of the $CPV_p$ calculation is illustrative and exemplary only, and other non-linear optimizations techniques may be used to develop the $CPV_p$ values for a unit.

The composite performance variable used to describe actual performance ($CPV_a$) is calculated using mathematical functions designed to determine a performance rating for a unit with a given series of output variable values step 2060. The $CPV_a$ may involve several equations that allow individual performance characteristics to be weighted and combined into a single composite value.

After $CPV_p$ and $CPV_a$ values for each selected unit, also known as a base unit, are determined, the outstanding performing units are selected based on the formula: $OPV = (CPV_p - CPV_a)/(CPV_p)$, wherein OPV is the outstanding performance value variable step 2070. Units with the lower OPVs are performing better than units with higher OPVs based on the current configuration of the comparative performance system. Outstanding performing units are interchangeably herein also referred to as outstanding units or outstanding base units. One or more outstanding units are selected based on their OPVs step 2080. If a single outstanding unit were selected, then a comparison between one or more target units and the outstanding unit would be a comparison with best of breed. However, when there is more than one outstanding unit selected (such as the best three units, the worst three units, or units in a predefined range (e.g., second quintile)), then the output variable values may be averaged for the outstanding units to establish a "peer unit" step 2090. In this embodiment, the term "peer unit" refers to a hypothetical unit composed by averaging the performance measures of outstanding units, except when there is only one outstanding unit such that the peer unit would be an actual unit.

Next, confidence intervals are calculated for the peer unit's output variable values (which are the averages of the output variable values of the outstanding units) step 2100. The confidence interval size is configurable and is determined using various techniques known to those of ordinary skill in the art. For example, a 95% confidence interval may be determined by using a student T-distribution.

After the percentile confidence intervals of the averages are computed. The difference between a target unit's performance values and percentile confidence interval represents the probabilistic estimate for the performance gap step 2110. This range is an estimate of the amount of reduction or increase, depending on the particular variable, that needs to be closed in order to achieve the desired performance levels. The technical details of how to close the identified gaps may be developed by those skilled in the art of particular type of units being analyzed.

The gaps may be defined as a percentile range, e.g., 95% confidence intervals, since in practice, there can be several practices that achieve efficient and reliable performance and consequently, a range represents a more realistic result than a single value number. However, care should be exercised in the analysis of the identified mathematical gaps to ensure they can be reduced in a safe and prudent manner and achieve the desired long-term improved operational performance.

Figure 2:
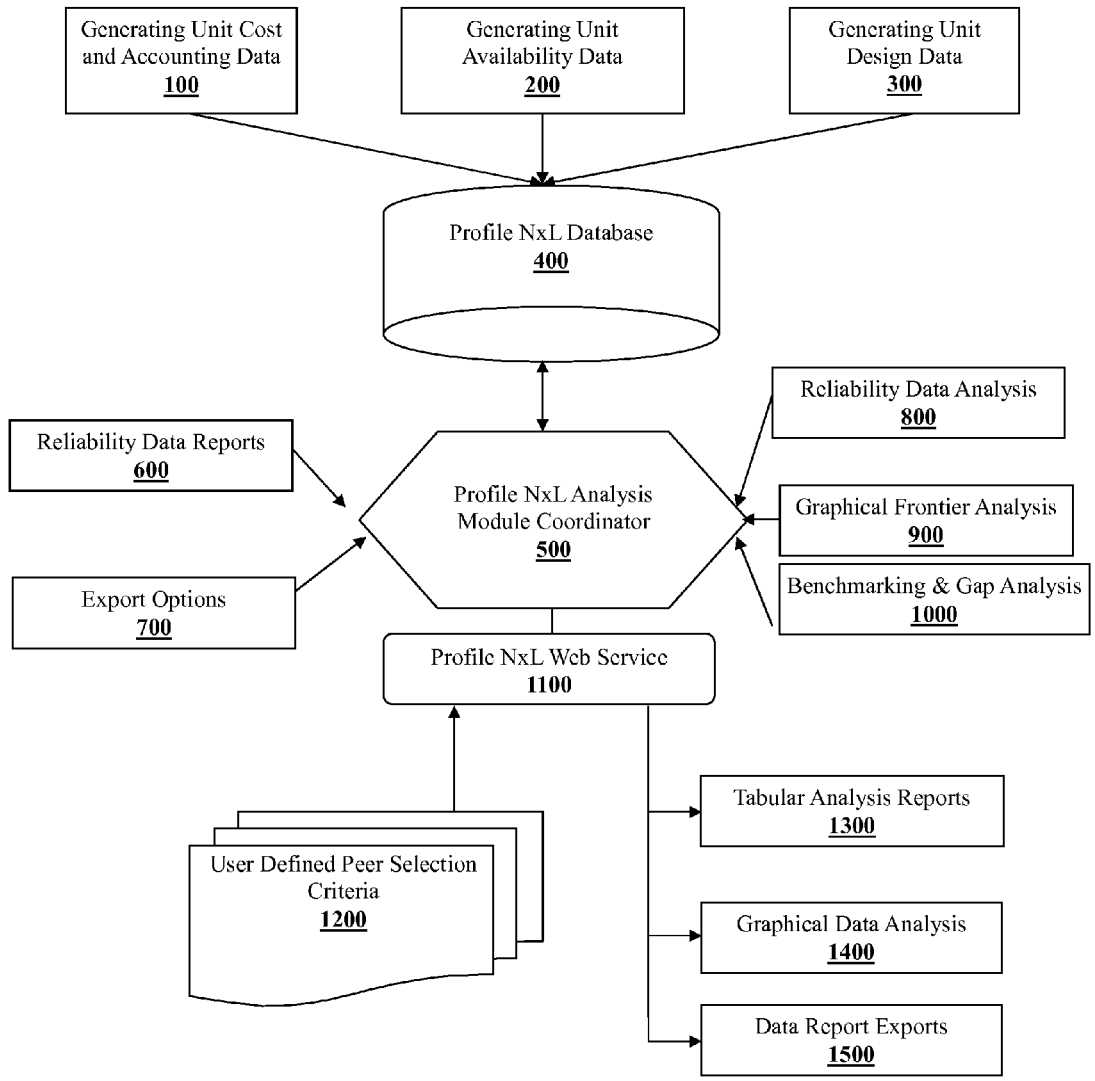
FIG. 2 is a diagram of the preferred embodiment of the system that enables the performance comparison analysis method.

As shown in FIG. 2, one embodiment of the method can be used for power generation benchmarking and gap analysis. This depiction of the system to support the method is illustrative and exemplary only. Operational and cost data for generating units where the design characteristics are known at a level of granularity consistent with the analysis goals serve as the basic inputs for the system. Cost data 100 include monies for operations, fuel, maintenance, and capital improvements in this embodiment. The data are consistent with the level of detail available in the reliability data (e.g., components, subsystems, systems and unit) and with the granularity of the reported reliability data (i.e., monthly). The use of reliability data is illustrative and exemplary only, as this method may use other types of data additionally or in place of reliability data.

The operational availability data 200 are composed of event and performance information. The event database is a detailed summary of the outage and derating events each unit had during any given period. Summarized on a monthly basis, the performance database includes capacity ratings, generation, loading modes, availability and unavailability hours, and fuel quality information for each unit.

The Generating Unit Design 300 database consists of details on the design parameters and installed equipment on each unit. The division of data into various databases is illustrative and exemplary only.

The integrated data are stored in the database 400. This database serves as the primary data source for all calculations and analysis. It is accessed by an analysis controller 500 that coordinates what specific calculations are requested by the user. The roles of analysis controller and database manager may be performed by the same person.

The analysis modules in this embodiment include reliability data analysis reports 600, which lists the desired reliability metrics in a user-specified format.

The export options module 700 enables users to transfer data and reports from this system to other user-specified systems for extended analyses.

The Reliability Data Analysis module 800 computes user-specific summary metrics and indices including but not limited to monthly, period average, or period total unitized cost data ($ per kW or per MWh) and reliability measures for the peer-unit group that includes the target unit(s) only, the peer-unit group including the target unit(s), or the peer-unit group excluding the target unit(s).

The Graphical Frontier Analysis Module 900 enables users to review various strategies assists the decision-making process in setting realistic unit performance targets based on data from actual achieved performance by units in the comparison analysis as selected by the user.

Figure 3A:
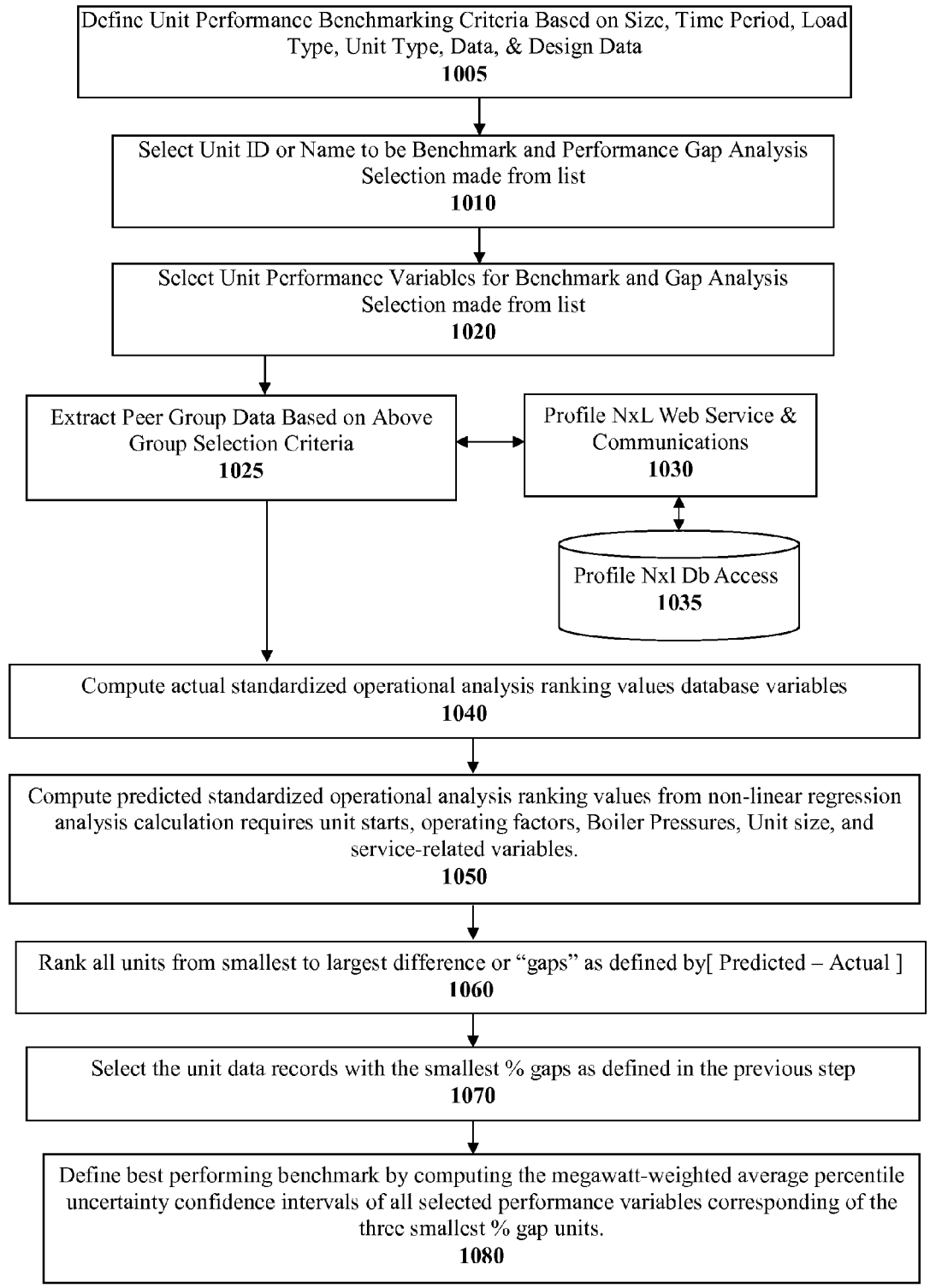

The Benchmarking & Gap Analysis module 1000 enables users to utilize the cost data 100, the operational availability data 200, and the generating unit design data 300 resident in the database 400 to additional quantitative comparative analyses. In step 1100 the user is enabled to enter and receive information via a security enhanced website service. In step 1200 the user selects a representative peer group against which the user's performance is analyzed. In step 1300 the results are transmitted by step 1100 tabular results for the user to review. In step 1400 the results are transmitted by step 1100 graphical results for the user to review. In step 1500 the results are transmitted by step 1100 to data report available for export, allowing the user to download results. As shown in FIGS. 3A and 3B, the user selection specifications are in several steps.

In step 1005, users select the performance benchmarking criteria based on size, time period, load type, unit type, and other design and performance data 1005. This criteria defines the peer-unit group that, for example, may have similar design characteristics and operational parameters of the target unit to the experience data contained in the database.

In step 1010, users select one or more target units to be benchmarked.

In step 1020, users select from a detailed list, the variables to be benchmarked and performance gaps measured. This list, in one embodiment of the invention, could include the variables listed in FIGS. 4A, 4B and 4C whose definitions are listed in the IEEE Standard No. 762 "Definitions for Use in Reporting Electric Generating Unit Reliability, Availability and Productivity."

At step 1025 peer group, target unit and variable data are extracted. This process is managed by the web service interface in 1030. This interface performs functions related to data security and information management between the database and the family of independent users. Via web service, database queries are performed on the database 1035 to select only those unit records that satisfy all of these criteria and the results stored for additional analyses.

The method internally computes the actual standardized operational analysis ranking variables from the database. This calculation involves the summation of standardized variables relating to heat rate, operating expenses, reliability and potentially other quantities 1040. Using non-linear optimization analysis methods, a predicted standardized operational analysis ranking variables is computed from a nonlinear combination of the input variables: unit starts, operating factors, boiler pressures, unit size, and additional service-related variables 1050. These input variables are illustrative and exemplary only.

In step 1060 all units in the peer group are ranked from smallest to largest difference: ([predicted−actual]/predicted) standardized operational analysis ranking variables. The difference values are a measure of performance.

In step 1070 the method selects the best performing units as those with the smallest gaps. The number to be selected is fixed to the user but may vary depending on the application. In this embodiment, the best performing group is chosen to be composed to the three smallest gap units.

In step 1080 the benchmark variables selected in step 1020 are weight-averaged by unit power output, in this embodiment, to determine a point estimate value for best performance of the user-defined peer group. The point estimates are then applied with other standard statistical methods to compute a percentile range, e.g. 95%, confidence interval around the mean point estimate to determine a range that is taken as best performance. In this embodiment a 95% confidence interval is generated using a student T-distribution, however, this is illustrative and exemplary only.

In step 1085 the difference between the best performance range and the specific values for the target unit(s) variables are computed. These ranges constitute the performance gaps between the target unit(s) and best actually achieved performance as computed in step 1080.

In steps 1090 and 1095 the gap ranges for all selected variables are displayed with detailed references to the peer group and the target unit characteristics are listed in tabular and/or graphical form.

As indicated by step 1099 and the "Go to Step 1005" step that immediately follows, this system and method is a dynamic framework that enables users to continuously select new analysis situations, and re-analyze and re-compare their units' performance by repeating the steps of FIGS. 3A and 3B as desired. The statistical and graphical presentations in steps 1090 and 1095 are important parts of the method that enables users to view and understand the results, and then re-select and thereby refine, their analysis set to more precisely define their performance peer group 1099.

The dynamic nature of this method allows users to identify key factors influencing performance. The procedure can be applied to general unit types or tailored to a specific generating unit. The result is a more focused peer unit group against which comparisons can be made.

The foregoing disclosure and description of various embodiments of the invention are illustrative and explanatory thereof, and various changes in the details of the illustrated system and method may be made without departing from the scope of the invention.

We claim:

1. A computer-implemented method of comparing an output variable value of a target unit with a corresponding output variable value of a peer unit comprising the steps of:
   (a) determining a value of a first composite performance variable for a plurality of base units, wherein the plurality of base units is a set of units that meet a predefined set of parameters, comprising the steps of:
       performing a non-linear optimization with at least one expert constraint,
           wherein the first composite performance variable comprises:
               at least one base unit input variable;
   (b) determining a value of a second composite performance variable for the plurality of base units, wherein the second composite performance variable comprises:
       at least one base unit output variable;
   (c) selecting at least two outstanding base units dependent on:
       the value of the first composite performance variable, and
       the value of the second composite performance variable;
   (d) determining a peer unit based on all outstanding base units, wherein determining a peer unit comprises:
       calculating output variable values for the peer unit based on the output variable values of the outstanding base units;
   (e) selecting a target unit for comparison to the peer unit, wherein the target unit may be an outstanding base unit;
   (f) selecting an output variable value for the target unit that corresponds to an output variable value for the peer unit; and
   (g) comparing the output variable value for the target unit with the corresponding output variable value for the peer unit,
   wherein steps (a), (b), (d), and (g) are performed by one or more computers.

2. The computer-implemented method of claim 1, wherein each of the plurality of base units is a power generating unit.

3. The computer-implemented method of claim 1, further comprising the steps of:
   determining an output variable value range based on a confidence interval and the output variable value for the peer unit; and
   determining a performance gap between the output variable value for the target unit and the output variable value range of the peer unit.

4. The computer-implemented method of claim 3, wherein the confidence interval is determined using a student T-distribution.

5. The computer-implemented method of claim 3, further comprising the step of:
   graphically displaying the performance gap between the output variable value for the target unit and the output variable value range of the peer unit.

6. The computer-implemented method of claim 3, wherein the method includes an additional step of:
   exporting the performance gap from the database.

7. The computer-implemented method of claim 6, wherein the exported performance gap is in the form of a report.

8. A system comprising:
   a server, comprising:
       a processor, and
       a storage subsystem;
   a database stored in the storage subsystem comprising:
       unit operating data;
   a computer program stored in the storage subsystem, when executed causing the processor to:
       (a) determine the value of a first composite performance variable for a plurality of base units,
           wherein the first composite performance variable includes at least one base unit input variable, and
           wherein the computer program when executed causes the processor to perform a non-linear optimization with at least one expert constraint;
       (b) determine the value of a second composite performance variable for the plurality of base units,
           wherein the second composite performance variable includes at least one base unit output variable;
       (c) select at least one outstanding base unit dependent on:
           the value of the first composite performance variable, and
           the value of the second composite performance variable;
       (d) determine a peer unit based on all outstanding base units,
           wherein the executed computer program causes the processor to:
               calculate output variable values for the peer unit based on the output variable values of the outstanding base units;
       (e) select a target unit for comparison to the peer unit, wherein the target unit may be an outstanding base unit;
       (f) select an output variable value for the target unit that corresponds to an output variable value for the peer unit; and
       (g) compare the output variable value for the target unit with the corresponding output variable value for the peer unit.

9. The system of claim 8, wherein each unit is a power generating unit.

10. The system of claim 8, wherein the computer program when executed causes the processor to:
    determine an output variable value range based on a confidence interval and the output variable value for a peer unit; and
    calculate a performance gap between the output variable value for the target unit and the output variable value range of the peer unit.

11. The system of claim 10, wherein the confidence interval is determined using a student T-distribution.

12. A system of claim 10, wherein the computer program when executed causes the processor to:
    graphically display the performance gap between the output variable value for the target unit and the output variable value range of the peer unit.

13. The system of claim 10, wherein the computer program when executed causes the processor to:
    export the performance gap from the database.

14. The system of claim 13, wherein the exported performance gap is in the form of a report.

* * * * *